Patented Dec. 4, 1945

2,390,089

UNITED STATES PATENT OFFICE 2,390,089

SUBSTITUTED 1,3,5-TRIAZINYL-(6)-AMINO-PHENYL-ARSENIC COMPOUNDS

Ernst A. H. Friedheim, New York, N. Y.

No Drawing. Application June 3, 1944,
Serial No. 538,694

8 Claims. (Cl. 260—242)

This invention relates to derivatives of triazines containing arsenic, and more particularly to triazine derivatives which contain trivalent arsenic.

In my U. S. Patent No. 2,295,574, issued on September 15, 1942, I have shown that condensation of suitable derivatives of symmetric triazine with phenyl-arsonic acid derivatives results in a new type of condensation products possessing valuable therapeutic properties in diseases caused by spirochaetes or trypanosomes, such as syphilis, and African sleeping sickness.

I have found that new triazine derivatives containing arsenic can be obtained by condensing derivatives of 1,3,5-triazine of the formula

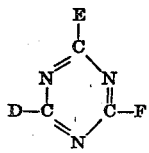

with an aromatic organic compound containing trivalent arsenic and corresponding to the formula W—C$_6$H$_2$(A,B)—As=X.

In these formulas, W is an amino-group or halogen. If W is an amino-group, at least one of the groups D, E, F, is a halogen-group. If W is a halogen, at least one of the groups D, E, F is an amino-group. In both cases the other groups are selected from the group consisting of halogen, NH$_2$, NH Alk., N Alk.$_2$, hydroxy-alkyl-amino, NHCH$_2$CHOHCH$_2$OH, dialkyl - amino - alkyl-amino, and aminoacyl radicals, such as NHCOCH$_3$ and NHCOC$_6$H$_5$; the radicals A and B are selected from the group consisting of hydrogen, halogen, OH, O Alk., O acyl, NO$_2$, NH$_2$, NH Alk., N Alk.$_2$, aminoacyl, and alkyl radicals; X is a divalent group selected from the group consisting of O, S, dihalides, such as Cl$_2$, I$_2$ or Br$_2$, and sulfur-containing radicals of the type =(S—R)$_2$ wherein R is an organic radical which is capable of carrying an SH-radical. Such sulfur-containing reactants are, for example, thioglycollic acid, cysteine, or glutathione, thiophenol. As examples of the trivalent arsenic compounds to be used according to my invention, the following may be mentioned: 4-amino-phenylarsinoxide, 4-chlor-phenyl-arsinoxide, 4-amino-phenyl-arsindichloride, 4-amino-phenyl-arsinsulfide, 3-amino-4-oxy-phenylarsinoxide.

The condensation products thus formed have the formula

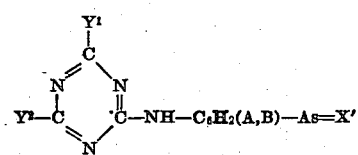

wherein Y$^1$ and Y$^2$ are each a radical selected from the group consisting of halogen, NH$_2$, NH Alk., N Alk.$_2$, hydroxy - alkyl - amino, NHCH$_2$CHOHCH$_2$OH, dialkyl - amino - alkyl-amino, and aminoacyl radicals; A and B are selected from the group consisting of hydrogen, halogen, OH, O Alk., O acyl, NO$_2$, NH$_2$, NH Alk., N Alk.$_2$, amino-acyl, and alkyl radicals, and X' is a divalent radical selected from the group consisting of O, S, dihalides, sulfur-containing groups of the type =(S—R)$_2$, wherein R is an organic radical which is capable of carrying an SH-radical, and groups having the formula

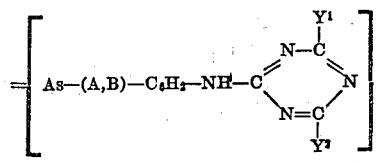

In carrying out the present invention, for example an aqueous solution containing one mol of 4-oxy-3-amino-phenyl-arsinoxide may be caused to react with a fine suspension of 1 mol of 2,4,6-trichloro-1,3,5-triazine in water at a temperature of 0° C. with the exclusion of oxygen. The resulting condensation product has the formula

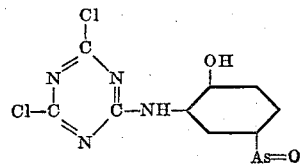

Subsequently, this reaction product may be treated with a base selected from the group consisting of ammonia, alkyl amines, hydroxy-alkyl amines and dialkyl-amino-alkyl amines. Similar reactions may be obtained by using a dihalide such as 4-amino-phenylarsindichloride instead of 4-oxy-3-amino-phenylarsinoxide. Instead of the latter, its derivatives or isomers, such as, for instance, 2-oxy-4-amino-phenyl-arsinoxide, or 4-amino-3-oxyphenylarsinoxide may also be used. In carrying out these reactions, instead of the trichloro-triazine other derivatives of 1,3,5-triazine corresponding to the formula referred to above may also be used.

I have further found that the condensation products according to this invention may also be obtained by first forming a condensation product of the type disclosed in my above mentioned U. S. Patent No. 2,295,574 from a derivative of 1,3,5-triazine and a substituted phenyl-arsonic acid, and converting the condensation product thus obtained, into a compound containing trivalent arsenic. I have found that such conversion can be performed without the disintegration of the basic triazinylaminobenzene structure by treating the triazinyl-aminobenzene-arsonic acid condensation product in hydrochloric acid solution, in the presence of hydriodic acid, with SO₂, hypophosphorous acid (H₂PO₃), or stannous chloride, or in neutral or alkaline solution with phenyl-hydrazine or sodium hydrosulfite (Na₂S₂O₄). The reduction with SO₂ or phenylhydrazine leads to the arsinoxides, or dihalogenarsines, while the treatment with stannous chloride, hypophosphorous acid, and sodium hydrosulfite leads to the corresponding arseno-compounds.

For example, one part by weight of 2,4-diamino-1,3,5-triazinyl-(6)-[amino-3-oxy-4-phenylarsonic acid I] is dissolved at about 80° C. in 100 parts of hydrochloric acid of sp. gr. 1.19. To the clear, warm solution 1/50 part of sodium iodide is added, and a stream of SO₂ gas is allowed to pass through the solution. After a few minutes the solution becomes cloudy, and the hydrochloride of 2,4-diamino-1,3,5-triazinyl-(6)-oxyaminophenylarsindichloride separates out in crystalline form. It is soluble in ethyl alcohol from which it may be recrystallized. It is slightly soluble in acetone, and insoluble in chloroform, CCl₄ and benzene. The corresponding arsinoxide is formed by the action of alkali, such as dilute ammonia or sodium bicarbonate on the arsindichloride.

An arseno-compound can be obtained by the action of stannous chloride on 2,4-diamino-triazinyl-(6)-[4-oxy-3-aminophenylarsonic acid I]. One part of the latter is suspended in 50 parts of aqueous hydrochloric acid of 1.19 density containing about 50% stannous chloride, and 1% of hydriodic acid. On gentle warming the substance goes slowly into solution, the reaction mixture taking a yellow color. It becomes cloudy, and on standing a yellow precipitate separates, which represents the hydrochloride of the bis [2,2'-4,4'-tetraamino-triazinyl-(6-6')]-3-3'-diamino-4-4' dioxyarseno-benzene of the formula

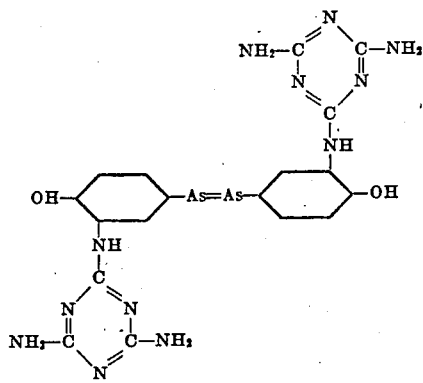

This compound is moderately soluble in dilute hydrochloric acid, and insoluble in ether and chloroform.

Other compounds according to my present invention may be obtained by applying the above described reduction processes to other arsonoanilino-triazine compounds, such as monochlormonoamino-arsono-anilino-triazine, and other arsono-anilino-triazine compounds obtained according to my above mentioned U. S. Patent No. 2,295,574.

As described in Example 2 of my above mentioned U. S. Patent No. 2,295,574, p-[2,4-dichloro-1,3,5-triazinyl-(6)]-aminophenylarsonic acid may be treated with ammonia in order to convert it into a 2-chloro-4-amino-compound by covering said dichloro-compound with 10 times the quantity of 10% aqueous ammonia, and shaking at 45° C. for 1 hour, whereby the product goes into complete solution. By heating the [2-chloro-4-amino-1,3,5-triazinyl-(6)]-aminophenyl-arsonic compound in hydrochloric acid solution with SO₂, a compound of the formula

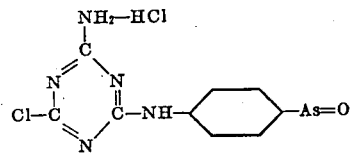

may be obtained.

1.45 parts by weight of 2,4-diamino-6-chloro-1,3,5-triazine are heated for 15–30 minutes with an aqueous alkaline solution of 2.62 parts by weight of 6-nitro-3-amino-phenyl-arsonic acid. After this period of heating the reaction mixture is allowed to cool to room temperature and is then precipitated with dilute hydrochloric acid in the cold. The precipitate which is filtered off and washed consists of a compound of the formula

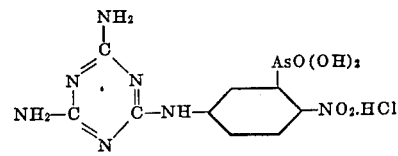

10 parts by weight of this precipitate are dissolved at 70°–80° C. in 1000 parts by weight of hydrochloric acid of sp. gr. 1.19. The solution is subjected to reduction of the —NO₂ and arsonic acid radicals by means of stanous chloride. The resulting compound corresponds to the formula:

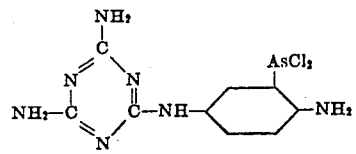

Instead of 6-nitro-3-aminophenyl-arsonic acid, 3-nitro-4-amino-phenylarsonic acid may be used in substantially identical manner to prepare a compound corresponding to the formula:

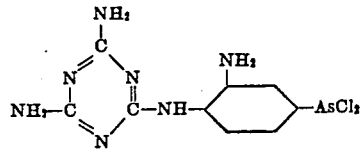

By reacting an aqueous alkaline solution containing one mol of 3,5-dinitro-4-amino-phenyl-arsonic acid of the formula

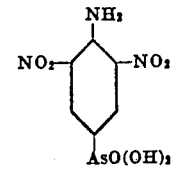

with a fine suspension of 1 mol of 2,4,6-trichloro-1,3,5-triazine in water at a temperature of 0° C., a condensation product of the formula

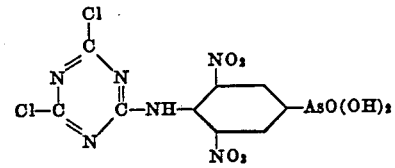

is obtained. In the condensation product thus formed, one or both halogen atoms may be substituted by —NH₂ groups by treating the condensation product with aqueous ammonia. The resulting 2,4 - diamino - 1,3,5-triazinyl-(6)-p-amino-3,5-dinitrophenyl-arsonic acid may be converted by reduction with stannous chloride in hydrochloric acid solution, into a compound corresponding to the formula

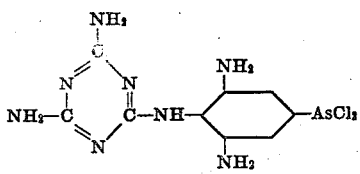

By subjecting the above described 2,4-dichloro-1,3,5-triazinyl condensation product to a treatment with dimethyl amine, one or both halogen substituents of the triazine ring may be substituted by dimethyl amino groups. Upon subsequent reduction in the above described manner, for example, a compound corresponding to the following formula is obtained:

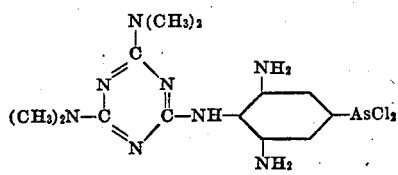

$\frac{1}{10}$ mol of 6-chloro-3-nitro-4-methylamino-phenyl-arsonic acid of the formula

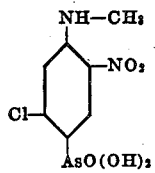

is reacted under reflux with $\frac{1}{10}$ mol of triamino-1,3,5-triazine. The reaction product, which corresponds to the formula

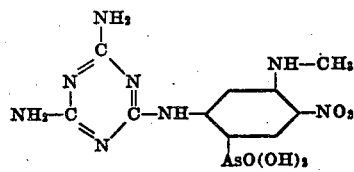

is subjected to reduction with sulfur dioxide in dilute hydrochloric acid solution in the presence of a small amount of HJ to form a reduction product of the formula

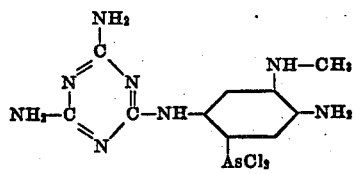

By using in the above process 2-chloro-4-dimethylamino-phenyl-arsonic acid in a substantially similar manner a compound corresponding to the formula

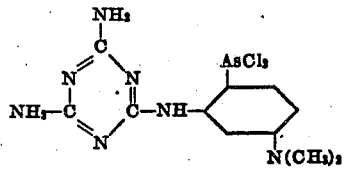

is obtained.

5-chloro-2-amino-phenylarsonic acid of the formula

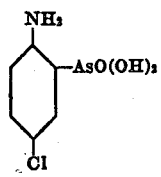

is subjected to reduction with SO₂-gas in dilute hydrochloric acid solution in the presence of a small amount of HJ. $\frac{1}{10}$ mol of the reduction product formed is reacted under reflux with $\frac{1}{10}$ mol of triamino-1,3,5-triazine in a non-oxidizing atmosphere. The reaction product corresponds to the formula

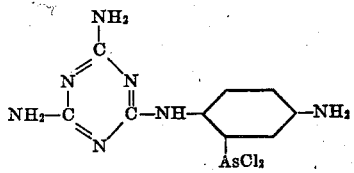

Reference is made to my co-pending application Serial No. 422,234, filed on December 9, 1941, of which this is a continuation-in-part.

It is to be understood that in the above specification and the appended claims the term "amino radicals" is used to include "—NH₂" radicals as well as the above disclosed substituted amino radicals.

I claim:
1. 1,3,5-triazine derivative of the formula

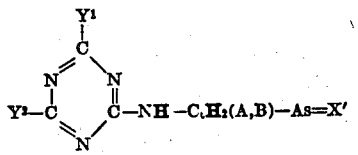

wherein at least one of $Y^1$ and $Y^2$ is an amino radical, while the other is selected from the group consisting of halogen radicals and amino radicals; C₆ represents a benzene ring, and A and B are amino radicals, and X' is a divalent radical selected from the group consisting of O, S, and dihalides.

2. A 1,3,5-triazine derivative of the formula

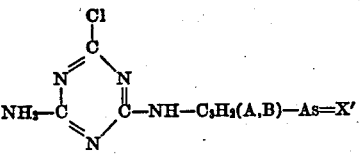

wherein C₆ represents a benzene ring, and A and B are amino radicals, and X' is a divalent radical selected from the group consisting of O, S and dihalides.

3. A 1,3,5-triazine derivative of the formula

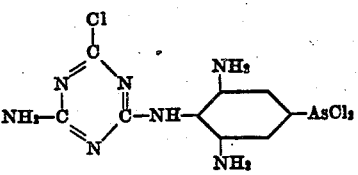

4. A 1,3,5-triazine derivative of the formula

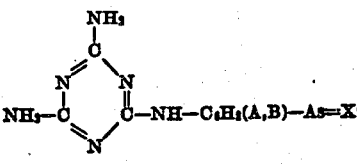

wherein $C_6$ represents a benzene ring, and A and B are amino radicals, and X' is a divalent radical selected from the group consisting of O, S and dihalides.

5. A 1,3,5-triazine derivative of the formula

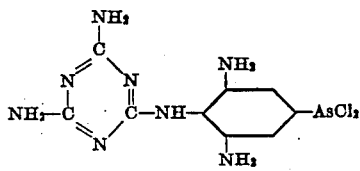

6. A process for the preparation of a 1,3,5-triazine derivative as claimed in claim 1, said process comprising subjecting in aqueous solution a 1,3,5-triazine derivative of the formula

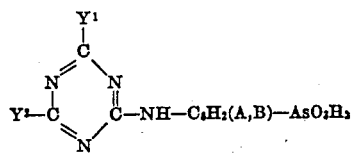

wherein at least one of $Y^1$ and $Y^2$ is an amino radical, while the other is selected from the group consisting of halogen radicals and amino radicals; $C_6$ represents a benzene ring, and A and B are amino radicals, to the action of a reducing agent.

7. A process for the preparation of a 1,3,5-triazine compound of the formula

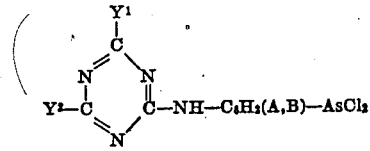

wherein at least one of $Y^1$ and $Y^2$ is an amino radical, while the other is selected from the group consisting of halogen radicals and amino radicals; $C_6$ represents a benzene ring, and A and B are amino radicals, said process comprising subjecting in aqueous solution a 1,3,5-triazine derivative of the formula

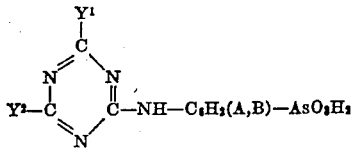

to the action of $SO_2$ in the presence of hydrochloric acid and hydriodic acid.

8. A process for the preparation of a 1,3,5-triazine compound of the formula

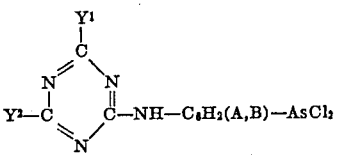

wherein at least one of $Y^1$ and $Y^2$ is an amino radical, while the other is selected from the group consisting of halogen radicals and amino radicals; $C_6$ represents a benzene ring, and A and B are amino radicals, said process comprising subjecting in aqueous solution a 1,3,5-triazine derivative of the formula

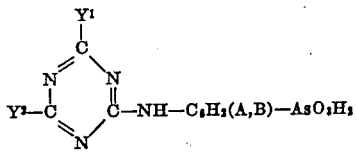

to the action of stannous chloride in the presence of hydrochloric acid.

ERNST A. H. FRIEDHEIM.